July 6, 1948.  M. D. BUTTERFIELD  2,444,898
TIRE RECAPPING MACHINE
Filed April 27, 1945  3 Sheets-Sheet 2
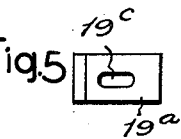
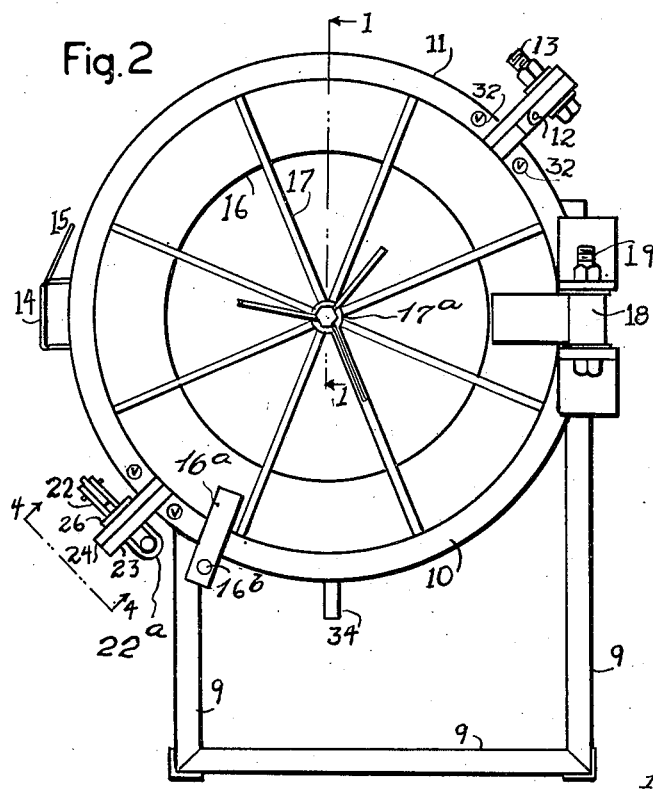
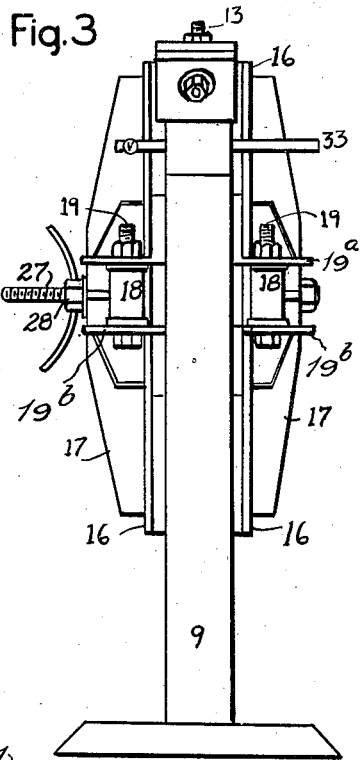
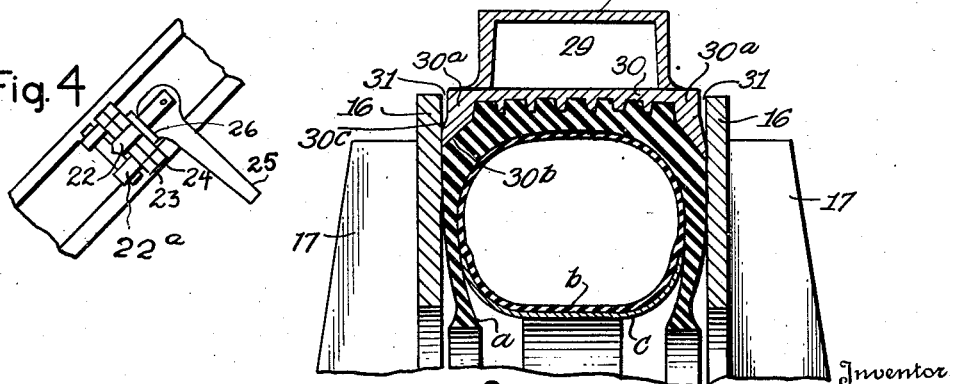
Inventor
M. D. Butterfield
By J. Harold Kilcoyne
Attorney July 6, 1948.     M. D. BUTTERFIELD     2,444,898
TIRE RECAPPING MACHINE
Filed April 27, 1945     3 Sheets-Sheet 3
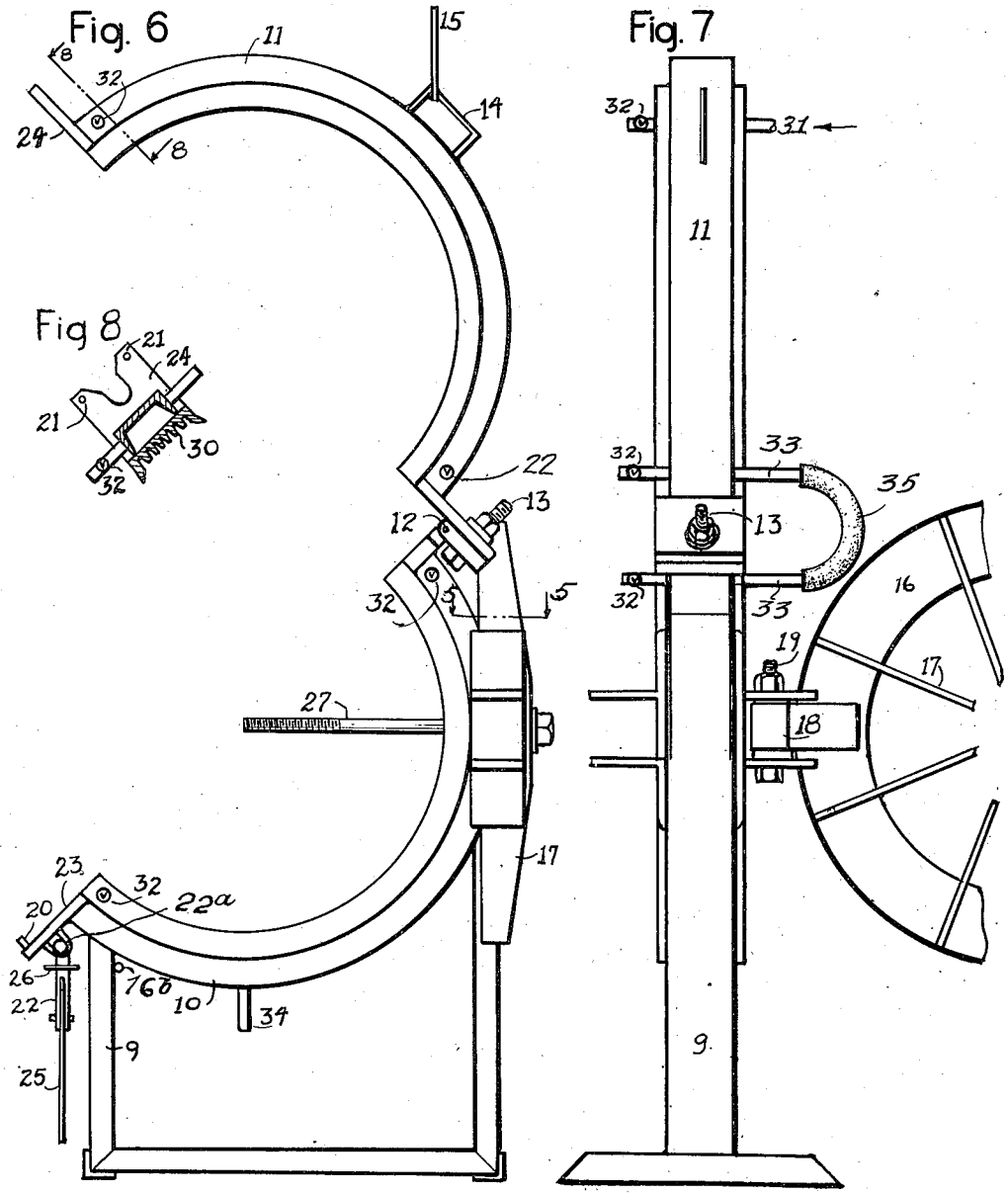

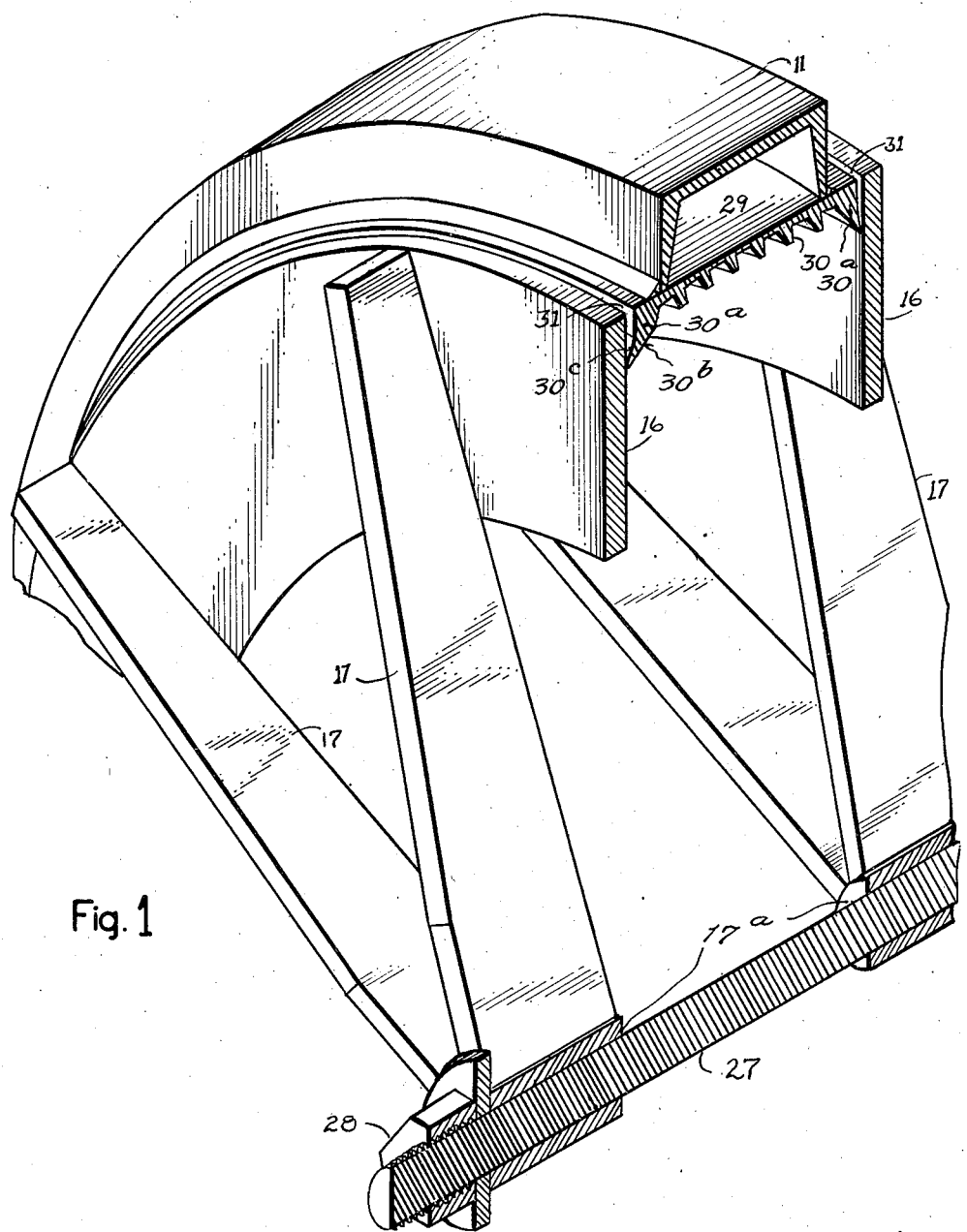

Patented July 6, 1948

2,444,898

UNITED STATES PATENT OFFICE 2,444,898

TIRE RECAPPING MACHINE

Melvin Dwight Butterfield, Wichita, Kans.

Application April 27, 1945, Serial No. 590,659

3 Claims. (Cl. 18—18)

This invention relates to improvements in tire recapping machines and has for principal objects the provision of a machine of the stated character in which the curing heat is applied evenly to and localized in the tread portion only of the tire being recapped, thereby to secure an even cure of the tread portion as well as to prevent any deleterious heating of the side wall and bead portions of the tire, and the provision of a tire recapping machine in which the side wall portions of the tire are effectively relieved of the relatively high pressures to which tires being recapped are usually subjected consequent to the inflation of the curing tube.

The invention has for its further objects the provision of a tire recapping machine of simple and thoroughly dependable construction and operation designed to hold a tire being recapped in a vertical plane whereby the tire may be inserted in and lifted from the machine with a minimum of time and labor; the provision of a tire recapping machine which will take the whole range of the popular size tires, for example those falling within the range of 550 x 18 to 650 x 15, without requiring change of mold parts; and the provision of a tire recapping machine adapted to effect a more satisfactory and efficient tire recapping job, with even cure in the tread portion and no curing of the side wall portions of the tire, at a lesser cost both in equipment and operation than is possible with the prior recapping machines.

The above and other objects are achieved by the mechanism illustrated in the accompanying drawings, in which Fig. 1 is a partial perspective view of a tire recapping machine according to the invention illustrating the relation of the mold steam chamber, tread mold or matrix and the bead locking rims in the closed position of the latter;

Fig. 2 is a side elevation of a complete recapping machine according to the invention with mold sections and bead locking rims in their closed position;

Fig. 3 is a rear end view of the closed machine;

Fig. 4 is a detail of the mold locking device;

Fig. 5 is a detail of the angle, a pair of which supports the hinge of a bead locking rim and provides for adjustment of the rim;

Fig. 6 is a side view of the machine with mold sections and bead locking flanges open;

Fig. 7 is a rear end view of the machine open, with left bead locking rim removed;

Fig. 8 is a section taken along line 8—8 of Fig. 6 illustrating the construction of mold section locking flange; and Fig. 9 is a section taken through the mold with tire and mold parts related for a curing run.

Referring to the drawings, wherein similar reference characters refer to similar parts thoughout the several views, a tire recapping machine according to the instant invention is supported on a simple channel iron frame 9 preferably of welded construction throughout, to which is welded the fixed semi-circular lower section 10 of the tire mold, it being noted that the mold section 10 is vertically disposed and is canted relatively forwardly whereby to permit ready mounting and removal of the tire therefrom. An upper semi-circular mold section 11 is hinged as at 12 to the lower section for opening and closed movement in a vertical plane and is moreover swiveled on the axis of a bolt 13 for lateral motion. Hence, the upper mold section may be raised verticaly about hinge 12 by a hoist line 15 connected to a handle 14 provided on the upper section and may then be swung to an out-of-the-way position either to the right or to the left about the axis of bolt 13.

The upper and lower mold sections 10 and 11, respectively, are adapted to be locked closed by locking means as shown in Fig. 4. To this end, the relatively open ends of the mold sections are provided with centrally notched or recessed locking flanges 23, 24, respectively, of which the flange 23 (Fig. 6) carries pins 20 adapted to engage in holes 21 provided in the locking flange 24, thereby to line up the mold sections in their closing movement. A T-shaped locking spindle 22, carried by bails 22a extending from the under face of the locking flange 23, is then swung upwardly and projected through the recesses of said flanges, and an eccentric lever 25 carried by the spindle is then closed down on a washer 26 slidable on the locking spindle which is adapted to bear tight against the upper flange 24, such functioning to effect secure locking of the mold section flanges 23, 24, one to the other.

The frame 9 also provides a mount for annular bead locking rims 16 having substantial radial depth as shown, the rims being reinforced by radial spokes 17 centered from hubs 17a and being moreover hinged to the frame 9 as at 18 to open outwardly on the axis of hinge bolts 19, which latter are carried by spaced angles 19a and 19b. To provide for relative adjustment of the bead locking rims, so that they may close tightly or loosely against the side walls of a tire inserted in the mold, the hinge bolt supporting angles are slotted as at 19c (Fig. 5), such permitting lateral adjustment of the bolt axes as required to effect tight or loose rim closing. In their closed position, the bead locking rims are centered with the mold sections through straps 16a which are apertured to receive a pin 16b welded to the frame 9; and the rims are secured closed by a rod 28 which is inserted through the central rim hubs, the rod being threaded at one end, and carrying a nut 28a functioning to pull the rims tight against the tire side walls.

Reverting to the mold sections 10 and 11, each is formed by an inwardly opening channel forming a steam chamber 29 and a tread mold or matrix 30 which may be formed in any one of many tread patterns. If desired, the tread mold may be made removable from the channel to effect interchange of patterns. It will be understood that the mold channels are interconnected, as will be described, so that when the mold sections are closed a full circular steam chamber is formed outwardly of the tread mold, into which a heating medium such as steam is passed, for the purpose of applying curing heat to the tread mold. Preferably the tread mold is formed by two semi-circular sections, the edges of which abut upon closing of the mold sections, so that the tread mold forms a complete circle whereby recapping by the full circle method may be achieved.

According to the invention, the tread mold 30 is provided with side flanges which are specially formed both to preclude any substantial transmission of heat to the bead locking rims 16 and also to positively control the closed position of the rims. To this end, the tread mold is provided with relatively thick side flanges 30a (Figs. 1 and 9) of depth to confine the tread being applied and the shoulder portion of the tire being recapped, and which extend straightway, i. e. radially inwardly from the horizontal web of the tread mold proper, for a portion of their depth, with their edge portions being flared to diverge outwardly and shaped to terminate in circular knife edges. Thus, considering the right-hand side flange 30a (Fig. 9) the under face 30b of its flared portion is sloped to set snugly against and hold down the recapping material applied to the tire casing. The outer face 30c of the rim edge portion, instead of being formed straight or flush with the outer face of the main flange body as is conventional, is also sloped or inclined sidewardly but at a lesser angle than that of the under face 30b of the flange, with the result that both inclined faces 30b, 30c of the flange edge diverge outwardly from the flange proper and the flange thus terminates in a full circular knife edge. It will be understood that the left hand side flange 30a of the tread mold is similarly but oppositely flared to diverge outwardly from the flange proper and to terminate in a knife edge. By further consideration of Figs. 1 and 9, it will be seen that the full circular knife edges in which the side flanges terminate are offset laterally and relatively outwardly of the tread mold and the straight portion of its side flanges.

By the aforesaid flange construction, closing of the bead locking rims 16 against the flanges results in line contact only therebetween, with the offsetting of the flange edges further resulting in the formation of an air space 31 between the outer faces of the tread side flanges and the relatively inner faces of the rims, which latter extend radially outwardly beyond their line of contact with the knife edges. Accordingly, the rims are maintained cool in their outer peripheral regions, and the small amount of heat passing to the rim consequent to their line contact with the tread mold side flanges is effectively absorbed or dissipated. The air spaces 31 moreover function to cool the tread mold side flanges and thereby to effect an even cure, from side to side, of the tire tread being applied. Accordingly, the invention achieves even cure of the tread being cured as well as localization of the curing heat in the tread portion of the tire being capped, which latter prevents any substantial heating up of the side wall and bead portions of the tire with which the rims engage. Hence, overcuring of the side wall portions of the tire which may result in the rubber breaking away from the fabric structure is effectively prevented. Moreover, due to the closing of the rims against the tire mold side flanges, their position is at all times controlled when closed, centering of the tire casing within the mold is thus assured in effective and positive manner, and the side walls of the tire are relieved from strain during inflation thereof.

In operation, a tire casing a prepared to be recapped and with camel back or other recapping material in place and with curing tube b (Fig. 9) disposed within its casing portion is mounted on a collapsible rim c in conventional manner and then inserted into the lower mold section, with the machine open as shown in Fig. 6. Due to the vertical disposition of the aforesaid mold section and the forward canting thereof, this operation may be easily effected with a minimum of time and labor. The upper mold section 11 is then lowered into place and locked to the lower section as previously described by means of eccentric lever 26. Thereupon the bead locking rims 16 from their open or inactive position are swung towards each other to engage against the outwardly offset knife edges extending along the inner edges of the tire mold side flanges, the rims then being pulled tight by means of rod 28 and nut 28a as previously described. During these preliminary operations, the tire is in deflated condition, but the relationship of mold to rim is such that closing of the mold sections and of the rims against the tire casing assures centering of the tire in the mold. The curing tube b is then inflated to force the recapping material into the tread mold cavities and against the under faces 30b of the mold side flanges, such inflation also distending the tire casing laterally against the bead locking rims. Since the rims close tight against the tread mold flanges and hence have fixed position, it will be appreciated that they take the component of lateral inflation force consequent to sideward distention of the curing tube and casing and hence relieve the side wall portions of the tire of the relatively high inflation pressure effective within the curing tube b. Live steam is then admitted to the steam chamber 29 of the upper mold section 11 through pipe 37, the steam chambers of the sections being in communication through pipes 33—33 connected by a flexible hose 35 (Fig. 7) and the sections being also provided with valves 32 to permit the escape of air therefrom. After air has been forced out of the steam chambers of both sections, the valves 32 are closed, and steam outlet pipe is connected into the return line to the boiler or other steam source, steam being thereupon run until the curing time has elapsed. The steam is then cut off and the machine opened for removal of the cured tire.

The above described tire recapping machine not only provides simple recapping procedure but it also provides equipment for effecting recapping with evenness of cure in the tread portion and without overheating or overstraining of the side wall and portions of the tire as is likely to result in deterioration or breaking down of these parts of the tire. A machine as described is moreover capable of taking care of all of the tires falling in the most popular size range without change of mold parts. For example, in a machine built according to the invention, recapping of tires in the size range of 550 x 18 to 650 x 15 was successfully effected, the machine permitting either tight or loose closing of the mold sections, and of the rims against the tread mold flanges, as required for variation in tire size within the stated range. To take care of the remaining popular size tires of the larger sizes, either a separate machine corresponding to the one described but having a larger tread mold or matrix is provided, or the described machine is set up for interchanging of matrices, so that a larger matrix as required for the larger size tires can be substituted in the frame 9 for the matrix taking the tires within the smaller range.

Having described one form of apparatus according to the invention, together with the operation thereof, I desire to to be understood that the illustrated form was selected for the purpose of facilitating disclosure of the invention rather than for the purpose of limiting the number of forms that the invention may take. It is to be further understood that various modifications, adaptations and alterations may be applied to the specific machine illustrated to meet the requirements of practice without in any manner departing from the spirit and scope of the present invention.

I claim:

1. A tire recapping machine comprising in combination, a fixed lower mold section mounted in a vertical plane, an upper mold section adapted to complement the lower section in forming a full circular mold, said mold sections having tread-confining side flanges terminating in outwardly offset, inner knife edges, means mounting said upper section for vertical opening and closing movement and for lateral swinging movement relative to the lower section, means for locking the mold sections closed, and radial bead locking rims mounted to swing on a substantially vertical axis from an inactive position to a closed position in which they engage with line contact only against the offset knife edges of the mold-section side flanges.

2. A tire recapping machine comprising in combination, a fixed semi-circular lower mold section disposed in a vertical plane and being forwardly canted for the ready insertion and removal of a tire casing therein, an upper semi-circular mold section adapted to complement the lower section, said mold sections having tread-confining side flanges terminating in outwardly offset, inner knife edges in forming a full circular mold, means mounting said upper section for vertical opening and closing movement and for lateral swinging movement relative to the lower section, means for locking the mold sections closed, and radial bead locking rims mounted to swing on a substantially vertical axis from an inactive position to a closed position in which they engage with line contact only against the offset knife edges of the mold-section side flanges.

3. A tire capping machine comprising a supporting frame, semi-circular mold sections supported from said frame and being disposed in a vertical plane, said lower section being canted forwardly for the ready insertion and removal of a tire casing therefrom, means providing both a hinge and a swivel connection between the sections, whereby the upper section may be moved vertically and swung laterally relatively to the lower section, said mold sections having tread-confining side flanges terminating in outwardly offset, inner knife edges and full-circular bead locking flanges supported from said frame for swinging movement on a vertical axis and being adapted for movement into line contact with the offset knife edges of the mold-section side flanges.

MELVIN DWIGHT BUTTERFIELD.

REFERENCES CITED

The following references are of record in the file of this patent:

UNITED STATES PATENTS

| Number | Name | Date |
|---|---|---|
| 1,307,798 | Stephan | June 24, 1919 |
| 1,392,487 | Earp | Oct. 4, 1921 |
| 2,147,339 | Glynn | Feb. 14, 1939 |
| 2,177,165 | Beckman | Oct. 24, 1939 |
| 2,178,908 | Hudson | Nov. 7, 1939 |
| 2,255,163 | Heintz | Sept. 9, 1941 |
| 2,259,975 | Hewel | Oct. 21, 1941 |